United States Patent
Ono et al.

(10) Patent No.: US 7,862,241 B2
(45) Date of Patent: Jan. 4, 2011

(54) ROLLING BEARING APPARATUS

(75) Inventors: Hiroshi Ono, Kashiwara (JP); Shinsuke Wai, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 410 days.

(21) Appl. No.: 12/078,285

(22) Filed: Mar. 28, 2008

(65) Prior Publication Data

US 2009/0041400 A1  Feb. 12, 2009

(30) Foreign Application Priority Data

Mar. 30, 2007 (JP) .............................. 2007-092053

(51) Int. Cl.
*F16C 33/78* (2006.01)
(52) U.S. Cl. ...................... 384/484; 384/459
(58) Field of Classification Search ................ 384/459, 384/477–489; 277/549, 551, 572, 576, 577
See application file for complete search history.

(56) References Cited

U.S. PATENT DOCUMENTS

| | | | | |
|---|---|---|---|---|
| 2,834,616 A | * | 5/1958 | Gebert | 277/356 |
| 2,879,114 A | * | 3/1959 | Bowen | 384/486 |
| 3,612,547 A | * | 10/1971 | Kan | 277/563 |
| 3,741,615 A | * | 6/1973 | Otto | 384/486 |
| 4,805,919 A | * | 2/1989 | Wiblyi et al. | 277/560 |
| 5,242,229 A | * | 9/1993 | McLarty | 384/484 |

FOREIGN PATENT DOCUMENTS

JP  5-22853  3/1993

* cited by examiner

*Primary Examiner*—Thomas R Hannon
(74) *Attorney, Agent, or Firm*—McGinn IP Law Group, PLLC

(57) ABSTRACT

A rolling bearing apparatus includes inner rings, an outer ring, and sealing devices each having a seal case fixed to the outer ring. The seal case includes a fixing portion press-fitted in the outer ring, and a ring-shaped portion extending radially inwardly from an axially-outer end of the fixing portion. The fixing portion has a ridge formed on and projecting radially outwardly from an outer peripheral surface thereof. The ridge is disposed nearer to the axially-outer end of the fixing portion than an axially inner end of the fixing portion.

4 Claims, 4 Drawing Sheets

ROLLING BEARING APPARATUS

BACKGROUND OF THE INVENTION

The present invention is related to a rolling bearing apparatus for supporting an axle of a railway vehicle.

One example of conventional bearing devices for rotatably supporting an axle of a railway vehicle is a rolling bearing apparatus including a double row tapered roller bearing provided at an end portion of the axle, and sealing devices provided respectively at axially-opposite ends of this double row tapered roller bearing. For example, JP-UM-5-22853 discloses such a bearing device.

FIG. 4 a cross-sectional view of a portion of a conventional rolling bearing apparatus used in a railway vehicle. This rolling bearing apparatus 100 comprises an inner ring 101 fitted on an axle S, an outer ring 102 fixed to the vehicle, tapered rollers 103 disposed between the inner and outer rings 101 and 102, and a sealing device 104 sealing a space between the inner and outer rings 101 and 102. The sealing device 104 comprises a seal case 105 fixed to the outer ring 102, and a seal member 106 retained by the seal case 105 and forming a seal between the seal case 105 and the axle S. The seal case 105 is fixed to an end portion of the outer ring 102, and includes a tubular fixing portion 105a press-fitted in an inner periphery of a shoulder portion 102a of the outer ring 102 to be fixed thereto, a ring-shaped portion 105d extending radially inwardly from an axially-outer end of the fixing portion 105a, and a tubular retaining portion 105b which extends axially outwardly from an inner peripheral edge of the ring-shaped portion 105d away from the outer ring 102 and retains the seal member 106 at a region disposed axially outwardly of the end face of the outer ring 102.

A ridge 105c is formed on and projects radially outwardly from a distal end portion of the fixing portion 105a. This ridge 105c is engaged in a seal groove 102b formed in the shoulder portion 102a, thereby limiting an axially-outward movement of the seal case 105.

In the above conventional rolling bearing apparatus, the sealing device 104 forms a seal between the seal case 105 and the axle S by the seal member 106, and also forms a seal between the seal case 105 and the outer ring 102 by surface-to-surface contact between the inner peripheral surface of the shoulder portion 102a of the outer ring 102 and the outer peripheral surface of the fixing portion 105a press-fitted in the inner peripheral surface of the fixing portion 105a.

However, the radially outwardly-projecting ridge 105c is formed at the distal end portion of the fixing portion 105a, and therefore when press-fitting the fixing portion 105a into the outer ring 102, the fixing portion 105a is deformed radially inwardly by an amount corresponding to an amount of radially-inward displacement of the ridge 105c by the inner peripheral surface of the outer ring 10, and when this deformation exceeds the range of elasticity (that is, the fixing portion 105a is plastically deformed), a clearance is formed between the inner peripheral surface of the shoulder portion 102a of the outer ring 102 and the outer peripheral surface of the fixing portion 105a.

Furthermore, when press-fitting the fixing portion 105a into the outer ring 102, the ridge 105c is often chipped upon contact with the inner peripheral surface of the shoulder portion 102a of the outer ring 102, and when a chip resulting from the ridge 105c is caught between the inner peripheral surface of the shoulder portion 102a of the outer ring 102 and the outer peripheral surface of the fixing portion 105a, there is a possibility that a clearance may be formed therebetween.

When a clearance is thus formed between the inner peripheral surface of the shoulder portion 102a of the outer ring 102 and the outer peripheral surface of the fixing portion 105a as described above, there are fears that dust, dirt, etc., may intrude into the interior of the rolling bearing apparatus and that grease within the bearing device may flow to the exterior, and as a result the durability of the rolling bearing apparatus is lowered. Therefore, it has been desired to provide means for forming a positive seal between the outer ring 102 and the seal case 105 so that the sealing performance of the sealing device can be enhanced.

SUMMARY OF THE INVENTION

This invention has been made in view of the above circumstances, and an object of the invention is to provide a rolling bearing apparatus in which a sealing performance of a sealing device is enhanced, thereby preventing the durability of the bearing from being lowered.

According to the present invention, there is provided a rolling bearing apparatus comprising:

an inner ring;

an outer ring that includes a seal groove formed in an inner peripheral surface of a shoulder portion of the outer ring and extending in a circumferential direction;

rolling elements rollably disposed between the inner and outer rings; and a sealing device that includes: a seal member for sealing a space between the inner and outer rings; and a seal case having a tubular fixing portion press-fitted in the inner peripheral surface of the shoulder portion of the outer ring, a ring-shaped portion extending radially inwardly from an axially-outer end of the fixing portion, a retaining portion extending axially outwardly from an inner peripheral edge of the ring-shaped portion and retaining the seal member, and a ridge which is formed on and projects radially outwardly from the fixing portion and is inserted in the seal groove, wherein the ridge is disposed nearer to the axially-outer end of the fixing portion than an axially-inner end of the fixing portion.

In the rolling bearing apparatus of the above construction, the ridge is formed on the portion of the fixing portion which is disposed nearer to the axially-outer end of the fixing portion than the axially-inner end of the fixing portion, that is, nearer to a bent portion between the fixing portion and the ring-shape portion which bent portion is higher in rigidity than the axially-inner end of the fixing portion. Therefore, when introducing the ridge into the inner periphery of the outer ring, the amount of deformation of the fixing portion is reduced, thereby preventing plastic deformation of the fixing portion, and the fixing portion can be positively brought into intimate contact with the outer ring. Furthermore, even if the ridge is chipped upon contact with the inner peripheral surface of the shoulder portion of the outer ring, there is a low possibility that a chip resulting from the ridge is caught between the outer peripheral surface of the fixing portion and the inner peripheral surface of the shoulder portion of the outer ring. And, the chip will not be caught between the fixing portion and the outer ring at least at a region disposed axially inwardly of the ridge, and therefore the fixing portion can be brought into intimate contact with the outer ring in a satisfactory manner. As described above, in the rolling bearing apparatus of the above construction, the seal case is positively brought into intimate contact with the outer ring, and by doing so, the ability of sealing between the outer ring and the seal case can be enhanced, and as a result the sealing performance of the sealing device as a whole can be enhanced.

Preferably, a circumferential recessed portion is formed in the ring-shaped portion, and is recessed in the axial direction. Thanks to the formation of this recessed portion, the ring-shaped portion can be easily elastically bent, and therefore when introducing the ridge into the inner periphery of the outer ring, the amount of deformation of the fixing portion can be reduced, thereby preventing plastic deformation of the fixing portion, and the fixing portion can be brought into intimate contact with the outer ring.

In the rolling bearing apparatus of the present invention, the sealing performance of the sealing device is enhanced, thereby preventing the durability of the bearing from being lowered.

DETAILED DESCRIPTION OF PREFERRED EMBODIMENTS

Figure 1:
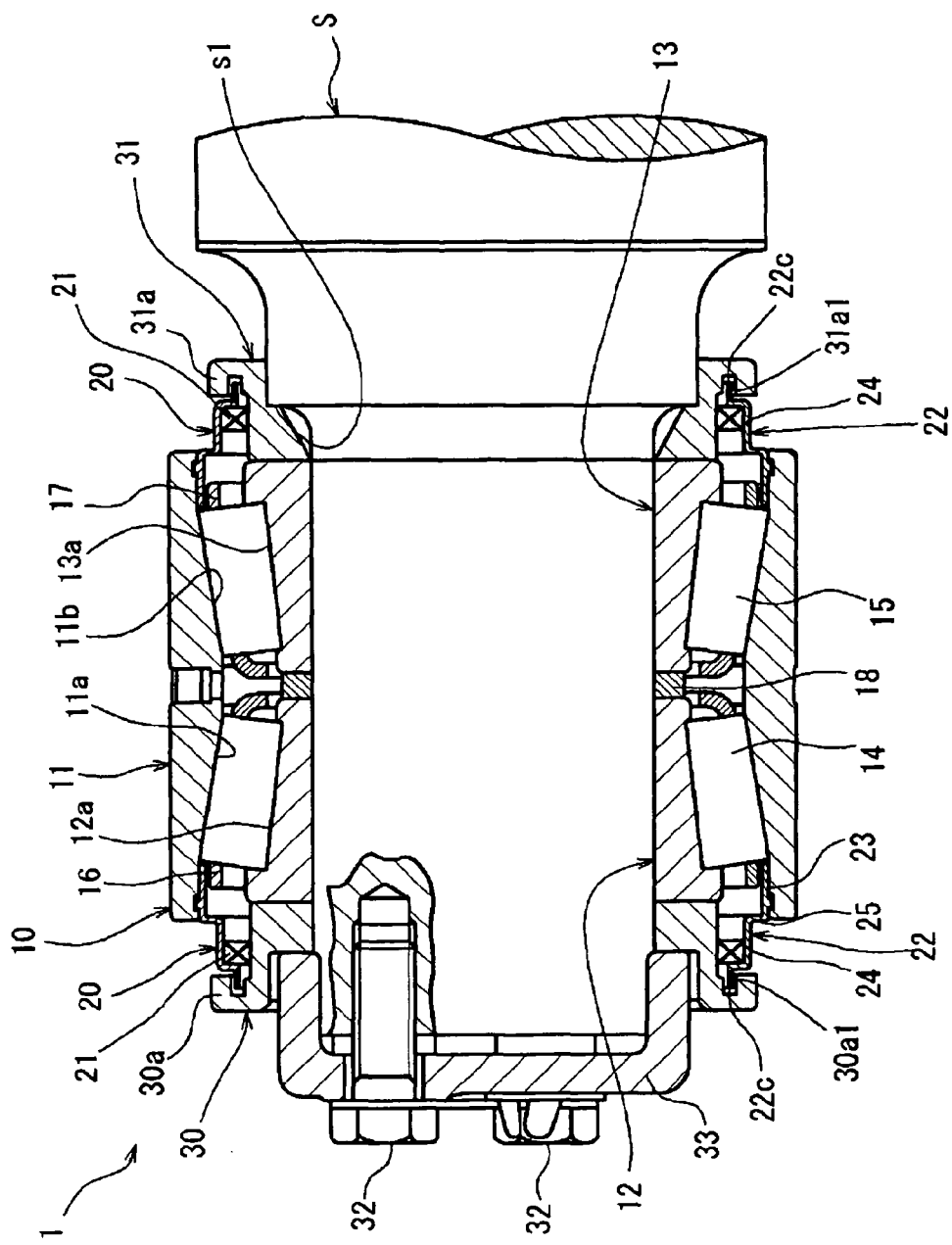
FIG. 1 is a cross-sectional view showing the construction of a first embodiment of a rolling bearing apparatus of the present invention used in a railway vehicle.

A preferred embodiment of the present invention will now be described with reference to the drawings. FIG. 1 is a cross-sectional view showing the construction of the first embodiment of a rolling bearing apparatus of the invention used in a railway vehicle. This rolling bearing apparatus 1 rotatably supports an axis S of the railway vehicle on a vehicle body.

Referring to FIG. 1, the rolling bearing apparatus 1 comprises a double row tapered roller bearing 10 fixedly fitted on an end portion of an axle S on which a wheel of the railway vehicle is fixedly mounted for rotation therewith, and a pair of sealing devices 20 sealing opposite ends of the tapered roller bearing 10, respectively. In the following description of the present specification, directions from an axially-central portion of the tapered roller bearing 10 respectively toward the axially-opposite ends thereof will be referred to as "axially outward direction", and directions respectively from the opposite ends of the tapered roller bearing 10 toward the axially-central portion thereof will be referred to as "axially inward direction".

The taper roller bearing 10 comprises an outer ring 11 fixed to the vehicle, a pair of inner rings 12 and 13 fixed to the axle S so as to rotate therewith, two rows of tapered rollers (rolling elements) 14 and 15 disposed between the outer ring 11 and the inner rings 12 and 13, and two cages 16 and 17 respectively holding the row of tapered rollers 14 and the row of tapered rollers 15.

The outer ring 11 is formed into a cylindrical one-piece construction, using alloy steel for machine construction, bearing steel or the like, and this outer ring 11 has a pair of outer ring raceways 11a and 11b formed on its inner peripheral surface. Each of the two inner rings 12 and 13 is formed into a cylindrical shape, using steel for machine construction, bearing steel or the like, and is fixedly fitted on the axle S. Inner ring raceways 12a and 13a are formed respectively on outer peripheral surfaces of the inner rings 12 and 13, and are opposed respectively to the outer ring raceways 11a and 11b.

The tapered rollers 14 are rollably disposed between the outer ring raceway 11a and the inner ring raceway 12a, and the tapered rollers 15 are rollably disposed between the outer ring raceway 11b and the inner ring raceway 13a. The outer ring 11 and each of the inner rings 12 and 13 are rotatable relative to each other. An annular spacer 18 is interposed between the pair of inner rings 12 and 13.

The pair of sealing devices 20 are fixed to axially-opposite ends of the outer ring 11, and each sealing device 20 comprises a seal member 21 sealing a space between the outer ring 11 and the inner ring 12, 13, and a seal case 22 retaining the seal member 21 at a region disposed axially outwardly of the outer ring 11.

The seal case 22 is formed, for example, by bending a cold rolled steel sheet (such as SPCC) by pressing. This seal case 22 includes a tubular fixing portion 23 press-fitted in an inner peripheral surface 11d of a shoulder portion 11c of the outer ring 11, a ring-shaped portion 25 extending radially inwardly from an axially-outer end of the fixing portion 23, and a retaining portion 24 which extends axially outwardly from an inner peripheral edge of the ring-shaped portion 25 and retains the seal member 21 at the region disposed axially outwardly of the end face of the outer ring 11.

The seal member 21 is fixed to an inner peripheral surface of the retaining portion 24, and therefore is retained by the retaining portion 24, and has a seal lip (not shown) held in sliding contact with an outer peripheral surface of an annular member 30, 31 fixedly fitted on the axle S (described later). The seal member 21 forms a seal between the seal case 22 (inserted in the outer ring 11 to be fixed thereto) and an outer peripheral surface of the annular member 30, 31 by the seal lip thereof, and seals an annular opening between the inner ring 12, 13 and the outer ring 11.

The annular members 30 and 31 are fixedly fitted on the axle S so as to rotate therewith, and are disposed at the opposite ends of the rolling bearing apparatus 1, respectively. The annular member 31 disposed at the proximal end-side (right-side) of the axle S abuts against a step portion s1 formed on the axle S, and is prevented from axial movement toward the proximal end side. A lid member 33 is fixed to the distal end portion of the axle S by bolts 32. The lid member 33 abuts against the annular member 30 disposed at the distal end portion of the axle S, and cooperates with the step portion s1 of the axle S to hold the rolling bearing apparatus 1 and the annular members 30 and 31 (disposed respectively at the opposite ends of the bearing device 1) therebetween and hence to hold the rolling bearing apparatus in position in the axial direction.

The annular members 30 and 31 have radially outwardly-projecting convex portions 30a and 31a, respectively. Annular grooves 30a1 and 31a1 are formed respectively in the convex portions 30a and 31a. A tubular portion 22c extends axially from a distal end of the retaining portion 24 of the seal case 22, and this tubular portion 22c is inserted in the annular groove 30a1, 31a1. The annular groove 30a1, 31a1 and the tubular portion 22c inserted therein jointly form a labyrinth seal, and enhances the ability of sealing between the seal case 22 and the annular member 30, 31.

Figure 2:
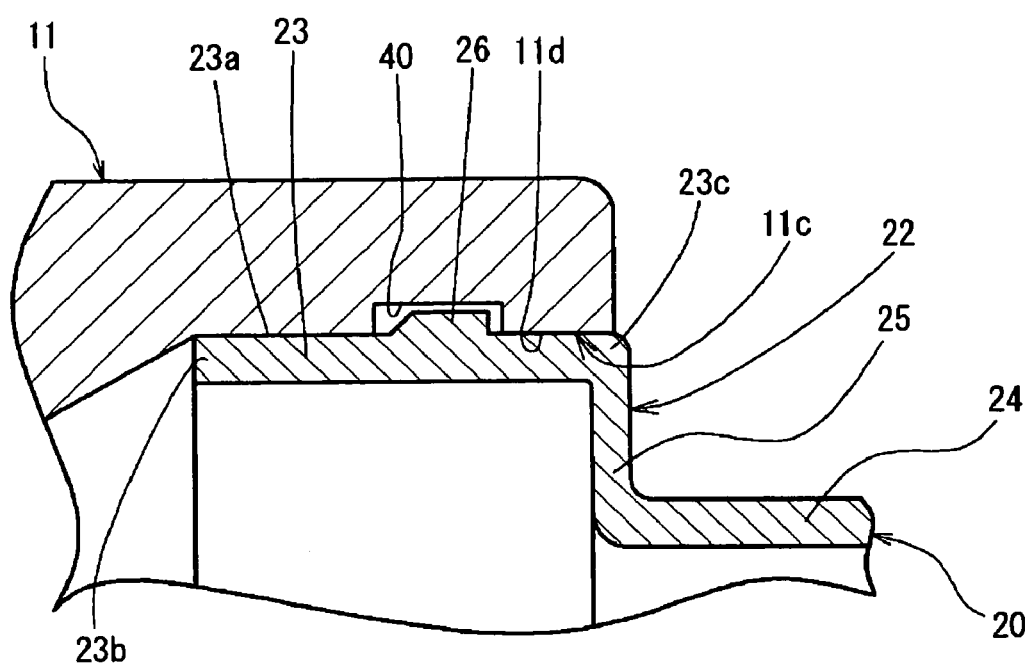
FIG. 2 is a cross-sectional view showing, one an enlarged scale, an important portion of a sealing device (shown in FIG. 1) disposed at a proximal end side of an axle.

FIG. 2 is a cross-sectional view showing, on an enlarged scale, an important portion of the sealing device 20 (in FIG. 1) disposed at the proximal end side of the axle S. In FIG. 2, a seal groove 40 is formed in the inner peripheral surface 11d of the shoulder portion 11c of the outer ring 11, and extends in the circumferential direction. The seal groove 40 is recessed radially outwardly from the inner peripheral surface lid of the shoulder portion 11c.

A ridge 26 is formed on and projects radially outwardly from an outer peripheral surface 23a of the fixing portion 23, and extends in the circumferential direction. The ridge includes an inclined surface radially outwardly extending from an outer periphery surface of the fixing portion, a cylinder surface communicating with the inclined surface and parallel to an axial direction of the sealing device, and an end surface communicating with the cylinder surface and extending radially. The ridge 26 is inserted in the seal groove 40, and when the seal case 22 tends to move axially outward, for example, because of an external factor, the ridge 26 is engaged with an inner side surface of the seal groove 40, thereby limiting this movement. Therefore, the sealing device 20 is prevented from being disengaged from the outer ring 11.

The ridge 26 is disposed axially outwardly of an axially-inner end 23b of the fixing portion 23. More specifically, the ridge 26 is disposed nearer to an axially-outer end 23c of the fixing portion 23 than the axially-inner end 23b. The axially-outer end 23c of the fixing portion 23 extends to the ring-shaped portion 25 through a bent portion, and therefore is higher in rigidity than the axially-inner end 23b of the fixing portion 23.

The seal case 22 is fixed to the outer ring 11 by press-fitting the fixing portion 23 into the inner peripheral surface 11d of the shoulder portion 11c of the outer ring 11. The sealing device 20 forms a seal between the seal case 22 and the outer ring 11 by the surface-to-surface contact between the inner peripheral surface 11d of the shoulder portion 11c of the outer ring 11 and the outer peripheral surface 23a of the fixing portion 23.

The ridge 26 is formed on the outer peripheral surface 23a of the fixing portion 23, and therefore for introducing this ridge 26 into the inner periphery of the outer ring 11, the fixing portion 23 need to be deformed in a diameter-decreasing direction (that is, radially inwardly). At this time, the fixing portion 23 is hardly plastically deformed beyond the range of elasticity since the ridge 26 is formed on the portion of the fixing portion 23 having a higher rigidity, and after the ridge 26 is inserted into the seal groove 40, the outer peripheral surface 23a of the fixing portion 23 is elastically restored, and is brought into intimate contact with the inner peripheral surface 11d of the shoulder portion 11c of the outer ring 11.

When introducing the ridge 26 into the inner periphery of the outer ring 11, the ridge 26 is often chipped upon contact with the inner peripheral surface 11d of the shoulder portion 11c. However, a chip resulting from the ridge 26 will not be caught between the fixing portion 23 and the outer ring 11 at a region disposed axially inwardly of the ridge 26, and instead the chip will be caught between the fixing portion 23 and the outer ring 11 somewhere at a narrow region disposed axially outwardly of the ridge 26 or will be discharged in accordance with the press-fitting of the fixing portion 23. Thus, the ridge 26 is formed at the portion of the fixing portion 23 disposed near to the axially-outer end 23c thereof, and therefore there is a low possibility that a chip resulting from the ridge 26 is caught between the fixing portion 23 and the outer ring 11, and the fixing portion 23 can be brought into intimate contact with the outer ring 11 in a satisfactory manner.

Therefore, in the rolling bearing apparatus 1 of this embodiment, the ability of sealing between the outer ring 11 and the seal case 22 can be enhanced, and as a result the sealing performance of the sealing device 20 as a whole can be enhanced. Therefore, the durability of the rolling bearing apparatus 1 can be prevented from being lowered.

Figure 3:
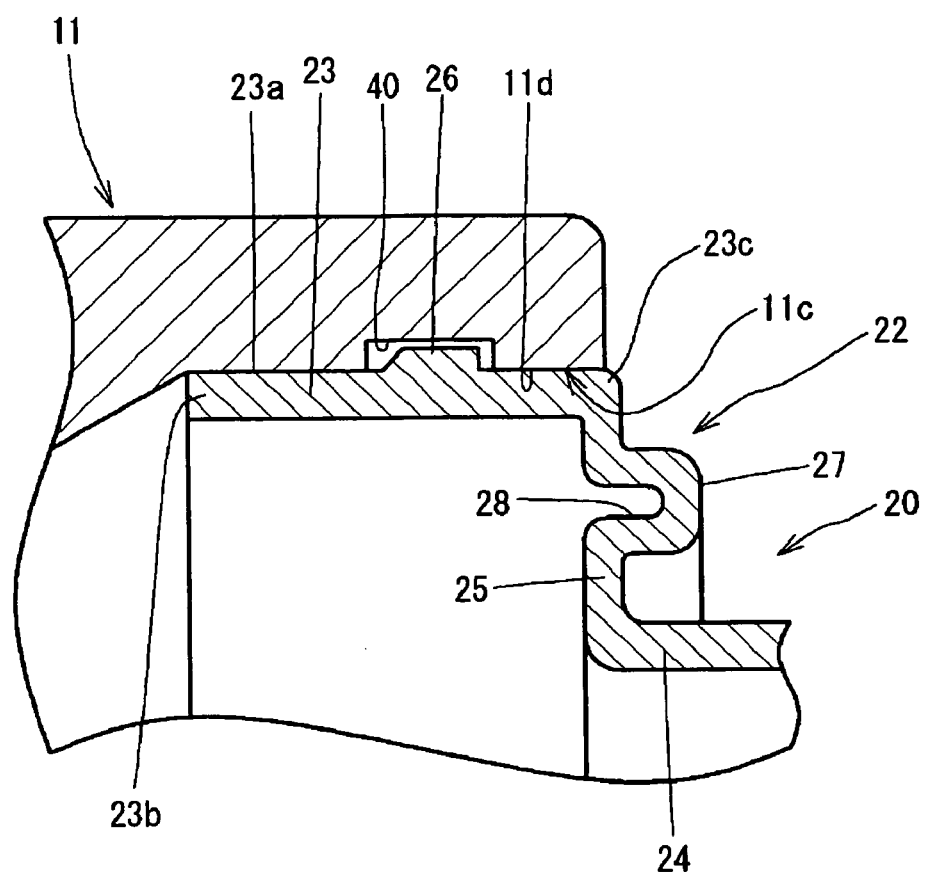
FIG. 3 is a cross-sectional view of an important portion of a second embodiment of the invention.
Figure 4:
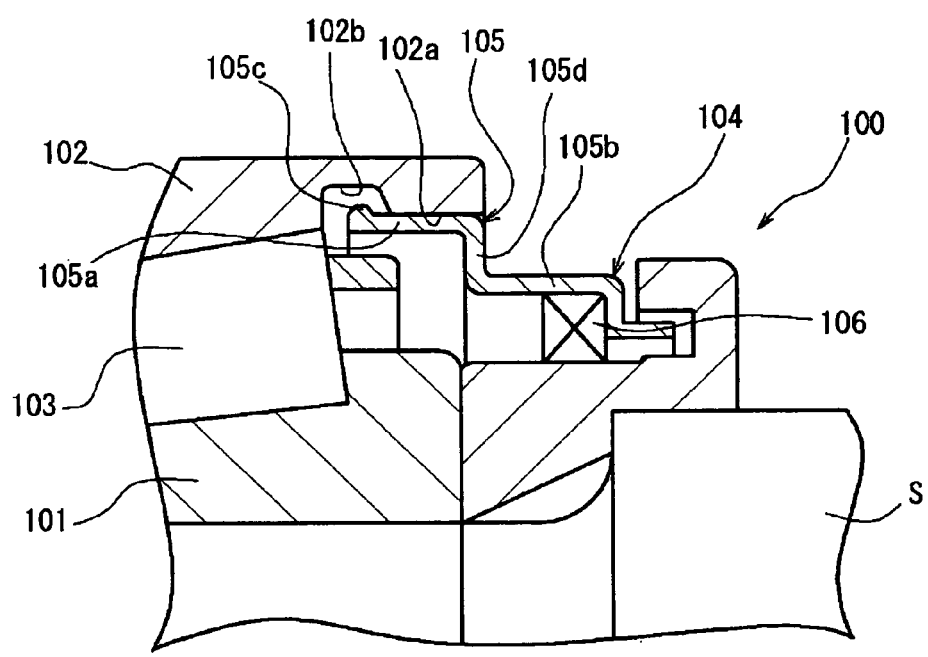
FIG. 4 a cross-sectional view of a portion of a conventional rolling bearing apparatus used in a railway vehicle.

FIG. 3 is a cross-sectional view showing an important portion of a sealing device provided in accordance with a second embodiment of the invention. In this embodiment, a recessed portion 28 recessed axially outwardly is formed in a ring-shaped portion 25 of a seal case 22, and extends in a circumferential direction. More specifically, a radially-intermediate portion of the ring-shaped portion 25 is bent into a U-shape to project radially outwardly, and as a result the recessed portion 28 is formed in an axially-inner surface of the ring-shaped portion 25, while a convex portion 27 is formed on an axially-outer surface of the ring-shaped portion 25.

In this embodiment, thanks to the formation of the recessed portion 28 at the ring-shaped portion 25, the ring-shaped portion 25 can be easily elastically bent. Therefore, when introducing a ridge 26 into an inner periphery of an outer ring 11, the amount of deformation of a fixing portion 23 is reduced, thereby preventing plastic deformation of the fixing portion 23. Therefore, the fixing portion 23 can be brought into intimate contact with the outer ring 11.

The present invention is not limited to the above embodiments, and suitable modifications can be made For example, in the second embodiment, a modified recessed portion 28 may be formed in the ring-shaped portion 25 by reducing the thickness of part of the ring-shaped portion 25. In another modified example, the recessed portion 28 may be formed in the axially-outer surface of the ring-shaped portion 25, while the convex portion 27 may be formed on the axially-inner surface of the ring-shaped portion 25.

What is claimed is:

1. A rolling beating apparatus comprising:
    an inner ring;
    an outer ring that includes a seal groove formed in an inner peripheral surface of a shoulder portion of the outer ring and extending in a circumferential direction;
    rolling elements rollably disposed between the inner and outer rings; and
    a sealing device that includes: a seal member for sealing a space between the inner and outer rings; and a seal case having a tubular fixing portion press-fitted in the inner peripheral surface of the shoulder portion of the outer ring, a ring-shaped portion extending radially inwardly from an axially-outer end of the fixing portion, a retaining portion extending axially outwardly from an inner peripheral edge of the ring-shaped portion and retaining the seal member, and a ridge which is formed on and projects radially outwardly from the fixing portion and is inserted in the seal groove,
    wherein the ridge is disposed nearer to the axially-outer end of the fixing portion than an axially-inner end of the fixing portion.

2. The rolling bearing apparatus according to claim 1, wherein the ring-shaped portion is formed with a recessed portion recessed in the axial direction.

3. The rolling bearing apparatus according to claim 1, wherein the ridge includes an inclined surface radially outwardly extending from an outer periphery surface of the fixing portion, a cylinder surface communicating with the inclined surface and parallel to an axial direction of the sealing device, and an end surface communicating with the cylinder surface and extending radially.

4. The rolling bearing apparatus according to claim 1, wherein the rolling bearing apparatus supports an axle of a railway vehicle.

* * * * *